US012670628B2

(12) United States Patent     (10) Patent No.:    US 12,670,628 B2

Min et al.            (45) Date of Patent:     Jun. 30, 2026

(54) COMPOSITIONAL IMAGE GENERATION AND MANIPULATION

(71) Applicant: NEC Laboratories America, Inc., Princeton, NJ (US)

(72) Inventors: Renqiang Min, Princeton, NJ (US); Kai Li, Plainsboro, NJ (US); Shaobo Han, Princeton, NJ (US); Hans Peter Graf, South Amboy, NJ (US); Changhao Shi, San Diego, CA (US)

(73) Assignee: NEC Corporation, Tokyo (JP)

( * ) Notice: Subject to any disclaimer, the term of this patent is extended or adjusted under 35 U.S.C. 154(b) by 326 days.

(21) Appl. No.: 18/463,784

(22) Filed: Sep. 8, 2023

(65) Prior Publication Data

US 2024/0087196 A1     Mar. 14, 2024

Related U.S. Application Data

(60) Provisional application No. 63/404,972, filed on Sep. 9, 2022.

(51) Int. Cl.

| | |
|---|---|
| *G06T 11/60* | (2026.01) |
| *G06T 9/00* | (2006.01) |
| *G06V 10/764* | (2022.01) |
| *G06V 10/774* | (2022.01) |
| *G06V 10/82* | (2022.01) |

(52) U.S. Cl.
CPC .............. *G06T 11/60* (2013.01); *G06T 9/002* (2013.01); *G06V 10/764* (2022.01); *G06V 10/774* (2022.01); *G06V 10/82* (2022.01)

(58) Field of Classification Search
CPC ....... G06T 11/60; G06T 9/002; G06V 10/764; G06V 10/774; G06V 10/82
See application file for complete search history.

(56) References Cited

U.S. PATENT DOCUMENTS

| | | | | |
|---|---|---|---|---|
| 2019/0295302 A1* | 9/2019 | Fu | ......................... | G06N 3/0475 |
| 2021/0110255 A1* | 4/2021 | Das | ......................... | G06N 3/047 |
| 2021/0241497 A1* | 8/2021 | Agrawal | .............. | G06N 3/0475 |
| 2022/0398697 A1* | 12/2022 | Vahdat | ................. | G06N 3/0464 |

OTHER PUBLICATIONS

Dhariwal et al—Diffusion Models Beat GANs on Image Synthesis—2021—NeurIPS (Year: 2021).*

He et al—Facial Attribute Editing by Only Changing What You Want—Jul. 26, 2018—arxiv (Year: 2018).*

Shen et al—InterFaceGAN Interpreting the Disentangled Face Representation Learned by GANs—Oct. 29, 2020—arXiv (Year: 2020).*

Menon et al., Dyadic Prediction Using a Latent Feature Log,Linear Model , 2018 , arXiv (Year: 2018).*

Nguyen et al., Statistical Latent Space Approach for Mixed Data Modelling and Applications, 2017, PRADA (Year: 2017).*

Li et al., "StyleT2I: Toward Compositional and High-Fidelity Text-to-Image Synthesis", In Proceedings of the IEEE/CVF Conference on Computer Vision and Pattern Recognition 2022, Jun. 2022, pp. 1-18.

* cited by examiner

*Primary Examiner* — YuJang Tswei

(74) *Attorney, Agent, or Firm* — Vincent Duffy

(57) ABSTRACT

Methods and systems for image generation include generating a latent representation of an image, modifying the latent representation of the image based on a trained attribute classifier and a specified attribute input, and decoding the modified latent representation to generate an output image that matches the specified attribute input.

19 Claims, 6 Drawing Sheets

COMPOSITIONAL IMAGE GENERATION AND MANIPULATION

RELATED APPLICATION INFORMATION

This application claims priority to U.S. Patent Application No. 63/404,972, filed on Sep. 9, 2022, incorporated herein by reference in its entirety.

BACKGROUND

Technical Field

The present invention relates to compositional image generation and, more particularly, to generative models with latent classifier guidance.

Description of the Related Art

Image generation can be accomplished through a variety of machine learning tools. However, controllable generation that is conditioned on particular contexts, such as class labels, text descriptions, or stroke painting, remain challenging. In particular compositionality is the ability of a conditional generative model to produce realistic outputs given multiple conditions.

SUMMARY

A method for image generation includes generating a latent representation of an image, modifying the latent representation of the image based on a trained attribute classifier and a specified attribute input, and decoding the modified latent representation to generate an output image that matches the specified attribute input.

A system for image generation includes a hardware processor and a memory that stores a computer program. When executed by the hardware processor, the computer program causes the hardware processor to generate a latent representation of an image, to modify the latent representation of the image based on a trained attribute classifier and a specified attribute input, and to decode the modified latent representation to generate an output image that matches the specified attribute input.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Machine learning models can be used for automatic image generation and manipulation. For example, a condition may be provided to modify an input image, and a machine learning model may be applied to modify the input image so that it more closely matches the condition.

Given a pre-trained generative model with a latent semantic space, a latent diffusion model and auxiliary latent classifiers may be trained to help manipulate latent representations in a non-linear fashion. Conditioning on multiple attributes, achieved by latent classifier guidance, maximizes a lower bound of the conditional log-likelihood and reduces to latent arithmetic under additional constraints. The loss function may include a guidance term that makes it possible to generate and manipulate output images in a realistic way, providing a flexible tradeoff between the controllability and the faithfulness of generated images. The guidance term helps to maintain the original image's semantics through the manipulation. The use of a latent diffusion model makes it possible to leverage the disentanglement property of the latent space.

Figure 1:
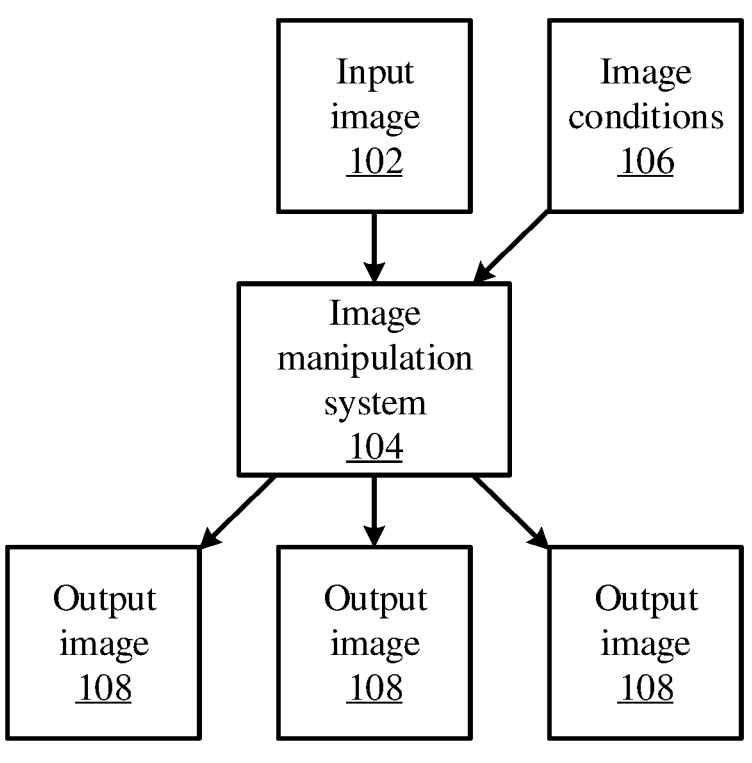
FIG. 1 is a diagram of an image manipulation system that can accept multiple image attribute conditions, in accordance with an embodiment of the present invention.

Referring now to FIG. 1, an exemplary image manipulation process/system is shown. An input image 102 is provided as input, as well as image manipulation conditions 106. The conditions 106 specify changes to make to the input image. Thus, if the input image 102 is a picture of a cat, the conditions 106 may be to specify a breed, a coloration, an expression, or any other quantifiable or natural language input. An image manipulation system 104 accepts the input image 102 and the image conditions 106 and generates one or more output images 108. The output images differ from the input image 102 and reflect the conditions 106.

The image manipulation system 104 may make use of a pre-trained generative model that makes use of a latent semantic space. A latent diffusion model and auxiliary latent classifiers are used to guide the generative model in its operation, so that the semantics of the input image 102 are preserved in the output images 108, and so that multiple different conditions 106 may be applied at once.

A diffusion model is a type of deep latent variable model that approximates an unknown data distribution $p(x)$ through smooth, iterative denoising steps. The diffusion model maps a predefined noise distribution to the data distribution using the formula $p_\theta(x_0) = \int p_\theta(x_{0:T}) dx_{1:T}$, where $x_{1:T}$ are the latent variables with the same dimensionality as the data $x_0$. T is the total number of diffusion and reverse diffusion steps.

The forward diffusion process resembles a parameter-free encoder and may be expressed as a Markov chain $$q(x_{1:T} \mid x_0) = \prod_{t=1}^{T} q(x_t \mid x_{t-1}),$$

where each $q(x_t|x_{t-1})$ may be a Gaussian distribution. The forward process perturbs inputs according to a predefined schedule, and the transformed data distribution $q(x_1|x_0)$ gradually converges to a standard Gaussian $\mathcal{N}(x_T; 0, I)$. The reverse sampling process resembles a hierarchical decoder and may include a sequence of denoising steps $p_\theta(x_{t-1}|x_t)$, which may be parameterized by a deep neural network with parameters $\theta$. The vector $0$ is a high-dimensional vector with all entries set to zero, while I is the identity matrix.

During training, inputs may be corrupted by the forward process, and the diffusion model may be trained to reconstruct the original inputs from the corrupted inputs. For denoising diffusion probabilistic models, the training objective may be formulated as a reweighted variational bound, treating the denoising diffusion probabilistic models as variational autoencoders. For score-based generative models, the objective may be derived using score matching. Once trained, to generate samples from the learned distribution, $x_T$ may be sampled from a standard Gaussian and then reverse process may be used to transform the sampled image into the image space.

A diffusion model may be trained to approximate the latent distribution $p(z)$ of a pre-trained image generator model G that maps a latent space $\mathcal{Z}$ to the image space $\mathcal{X}$. The latent space has properties, such as disentanglement, which can facilitate more controllable manipulations of generated images compared to the image space. Additionally, using guidance in the latent space is more feasible, since training latent guidance terms may be easier than training other manipulation methods in the image space.

Conditional generation with diffusion models relies on perturbing unconditional generation with user-specified guidance terms. Conditional generation models the conditional distribution $p(z|y)$, where y specifies the conditions or attributes. By Bayes rules, $p(z_t|y)=p(z_t)p(y|z_t)/p(y)$, the score of the conditional probability $\nabla_{z_t} \log p(z_t|y)$ can be factorized as the unconditional score $\nabla_{z_t} \log p(z_t)$ and the gradient flow $\nabla_{z_t} \log p(y|z_t)$. Therefore, an unconditional latent diffusion model may be used with a latent classifier to model the conditional score, known as classifier guidance. In practice, the classifier guidance term may be scaled by a factor $\alpha$, such that $\nabla_{z_t} \log p(z_t|y)=\nabla_{z_t} \log p(z_t)+\alpha\nabla_{z_t} \log p(y|z_t)$. The term $\alpha$ serves as a temperature parameter to add another layer of controllability to the sharpness of the posterior distribution $p(y|z_t)$.

Compositional image generation may be regarded as conditional generation with multiple conditions and the relations among them. Two examples of such relations include the conjunction "AND" and the negation "NOT." For the conjunction of n attributes $y^1 {}^\wedge y^2 {}^\wedge \ldots {}^\wedge y^n$, assuming the conditions to be independent of one another, the compositional log probability may be factorized as:

$$\nabla_{z_t} \log p(z_t \mid y^1, y^2, \ldots, y^n) = \nabla_{z_t} \log p(z_t) + \sum_{i=1}^{n} \alpha_t^i \nabla_{z_t} \log p(y^i \mid z_t)$$

With attribute negations $y^1 {}^\wedge \ldots {}^\wedge y^{m-1} {}^\wedge \overline{y^m} {}^\wedge \ldots \overline{y^n}$, without loss of generality, the log probability can be factorized similarly $$\nabla_{z_t} \log p(z_t \mid y^1, \ldots, y^n) =$$

$$\nabla_{z_t} \log p(z_t) + \sum_{i=1}^{m-1} \alpha_t^i \nabla_{z_t} \log p(y^i \mid z_t) - \sum_{i=m}^{n} \beta_t^i \nabla_{z_t} \log p(y^i \mid z_t)$$

While classifier guidance is useful for compositional generation, there is no guarantee that the results will be similar to the original image when doing manipulations. This is because the generation may not be conditioned on the original image. As there is no constraint on the specific form of the posterior, conditioning on the original image may be accomplished by adding a guidance term $\gamma_t\nabla_z \log p(\hat{z}|z)$, where $\hat{z}$ is the latent projection of the image to be manipulated. For conjunction relations, the overall score function for manipulation then becomes:

$$\nabla_{z_t} \log p(z_t \mid y^1, y^2, \ldots, y^n, \hat{z}) =$$

$$\nabla_{z_t} \log p(z_t) + \sum_{i=1}^{n} \alpha_t^i \nabla_{z_t} \log p(y^i \mid z_t) + \gamma_t \nabla_{z_t} \log p(\hat{z} \mid z_t)$$

When $p(\hat{z}|z)$ is modeled by an isotropic Gaussian distribution, the guidance term $\gamma_t\nabla_z \log p(\hat{z}|z)$ behaves as a regularization term $$\nabla_{z_t} \|z_t - \hat{z}\|_2^2$$

to make sure the update stays close to the current $\hat{z}$.

Training of unconditional diffusion models and the latent classifiers can be decoupled, and such training may be expressed as maximizing the evidence lower bound of the conditional log likelihood. Encompassing may be performed by training classifiers on them, and the latent diffusion model as well as previously used classifiers can be recycled. Using the denoising diffusion probabilistic model as an example, the unconditional evidence lower bound may be expressed as:

$$\mathcal{L}_{uncond} := \mathbb{E}_{q(z_{1:T}|z_0)}\left[\log\frac{p(z_T)}{q(z_T \mid z_0)} + \sum_{t=2}^{T}\log\frac{p(z_{t-1} \mid z_t)}{q(z_{t-1} \mid z_t, z_0)} + \log p(z_0 \mid z_1)\right]$$

The conditional evidence lower bound with a condition y may be expressed as:

$$\mathbb{E}_{q(z_{1:T}|z_0)}\left[\sum_{t=1}^{T}\log p(y \mid z_{t-1})\right] + \mathcal{L}_{uncond} + C$$

where $\mathbb{E}$ is an expectation value. With independent conditions $\{y^1, y^2, \ldots, y^n\}$ and $\hat{z}$, the lower bound is given by:

$$\mathbb{E}_{q(z_{1:T}|z_0)}\left[\sum_{t=1}^{T}\left[\sum_{i=1}^{n}\log p(y^i \mid z_{t-1}) + \log p(\hat{z} \mid z_{t-1})\right]\right] + \mathcal{L}_{uncond} + C.$$

Training unconditional diffusion models and their latent classifiers is equivalent to maximizing the evidence lower bound of joint log likelihood of z and y, up to a constant C. The lower bound shows that the gradient of multiple condition prediction classifiers may be used to guide image denoising in compositional image generation.

The regularized guidance manipulates a given latent $\hat{z}$ in a non-linear fashion, but it degrades to linear manipulation with additional assumptions. In the example where there are only conjunction relations, when $p(z_t)$ is non-informative and $\log p(y|z_t)$ is linear, the proposed manipulation is endowed with an analytic solution:

$$z_0 = \hat{z} + \frac{1}{\gamma_0} \sum_{i=1}^{n} \alpha_0^i w^i$$

where $$\alpha_0^i$$

is a scalar value and $w^i$ is the gradient of the log-linear condition predictor log p $(y|z_t)$. For attribute negation, the solution perturbs $\hat{z}$ toward the negative direction of the classifiers. This is a natural multi-attribute generalization of vector arithmetic, referred to herein as the linear version of latent classifier guidance.

Figure 2:
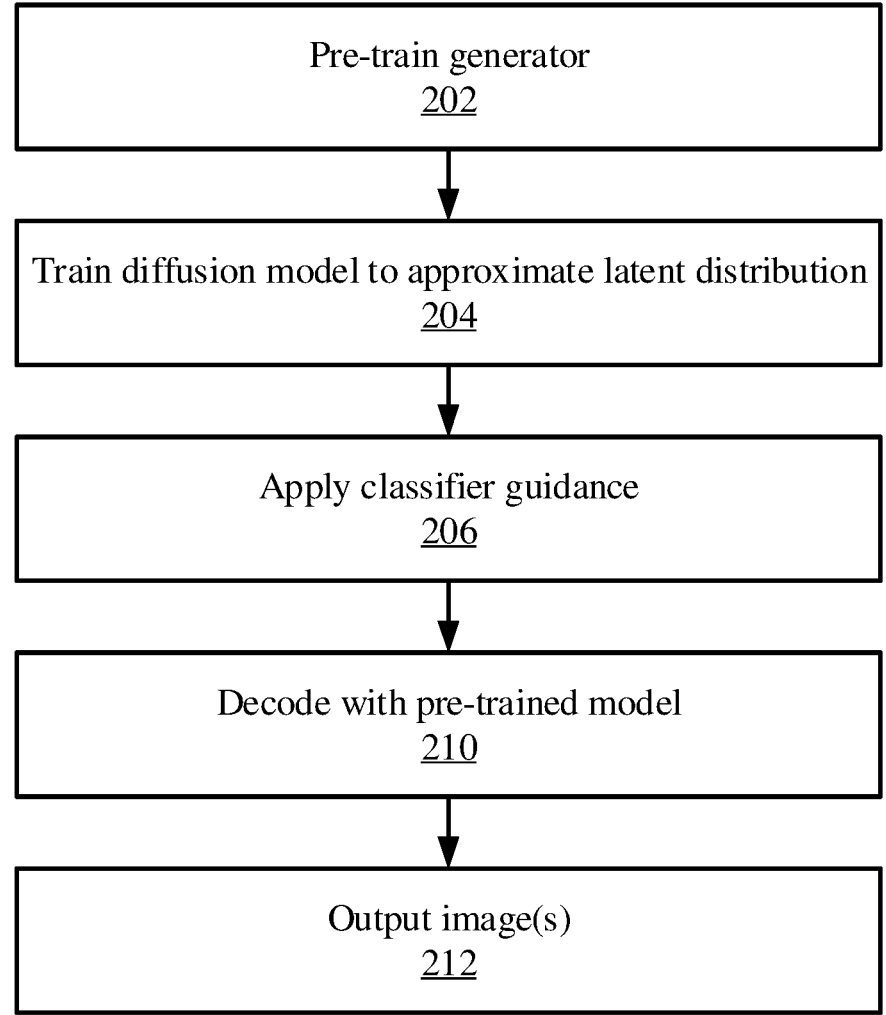
FIG. 2 is a block/flow diagram of a method of manipulating an image according to attribute classifier guidance, in accordance with an embodiment of the present invention.

Referring now to FIG. 2, a method of training a model is shown. Block 202 pre-trains an image generation model using a training dataset. It should be understood that any appropriate image generation model may be used, as long as it makes use of a semantic latent space. Thus, for a generator G that maps a latent space $\mathcal{Z}$ to the pixel space $\mathcal{X}$, block 204 trains a diffusion model to approximate the latent distribution p(z). Thus, an existing generative model, having a latent semantic space, may be augmented with the capability to provide compositional generation by using attribute classifiers to manipulate the latent representation.

As described above, classifier guidance is employed in block 206 in the latent diffusion models as a guidance term $\gamma_t \nabla_z$ log p $(\hat{z}|z)$. Attribute classifiers are trained as auxiliary classifiers. Thus, for an image containing a given attribute, the label for the image may be set as 1 for the attribute and 0 otherwise. An auxiliary classifier may be trained for this attribute across a set of images with the latent embedding of the images as input. The classifiers p(y|z) may be trained using latent representations of z as input.

During operation, an image 102 and guidance terms 106 are provided to the trained models. The trained diffusion model projects the input image onto the latent space and the image generator includes a decoder that maps the latent representations of the input image back to pixel space using a decoder in block 210. Such images may be generated and output in block 212.

The generative model may include an encoder and a decoder. The encoder maps the image to the latent space to form a latent representation. The representation is manipulated by the attribute classifiers in block 206 to obtain an updated latent representation. The decoder maps the updated latent representation back to image space to generate an image that incorporates the desired attributes.

Manipulating the latent representation can include training a diffusion model to approximate the latent distribution of a generative model and applying the classifier guidance to achieve compositional generation of the manipulated embedding. In another approach, when the attribute classifiers are degenerated into log-linear classifiers, linear attribute predictors can be trained with linear combinations of weight vectors being added as a guidance term to the original embedding to obtain the manipulated latent embedding. In both approaches, the manipulated embedding is sent to the decoder to generate the final output images.

Figure 3:
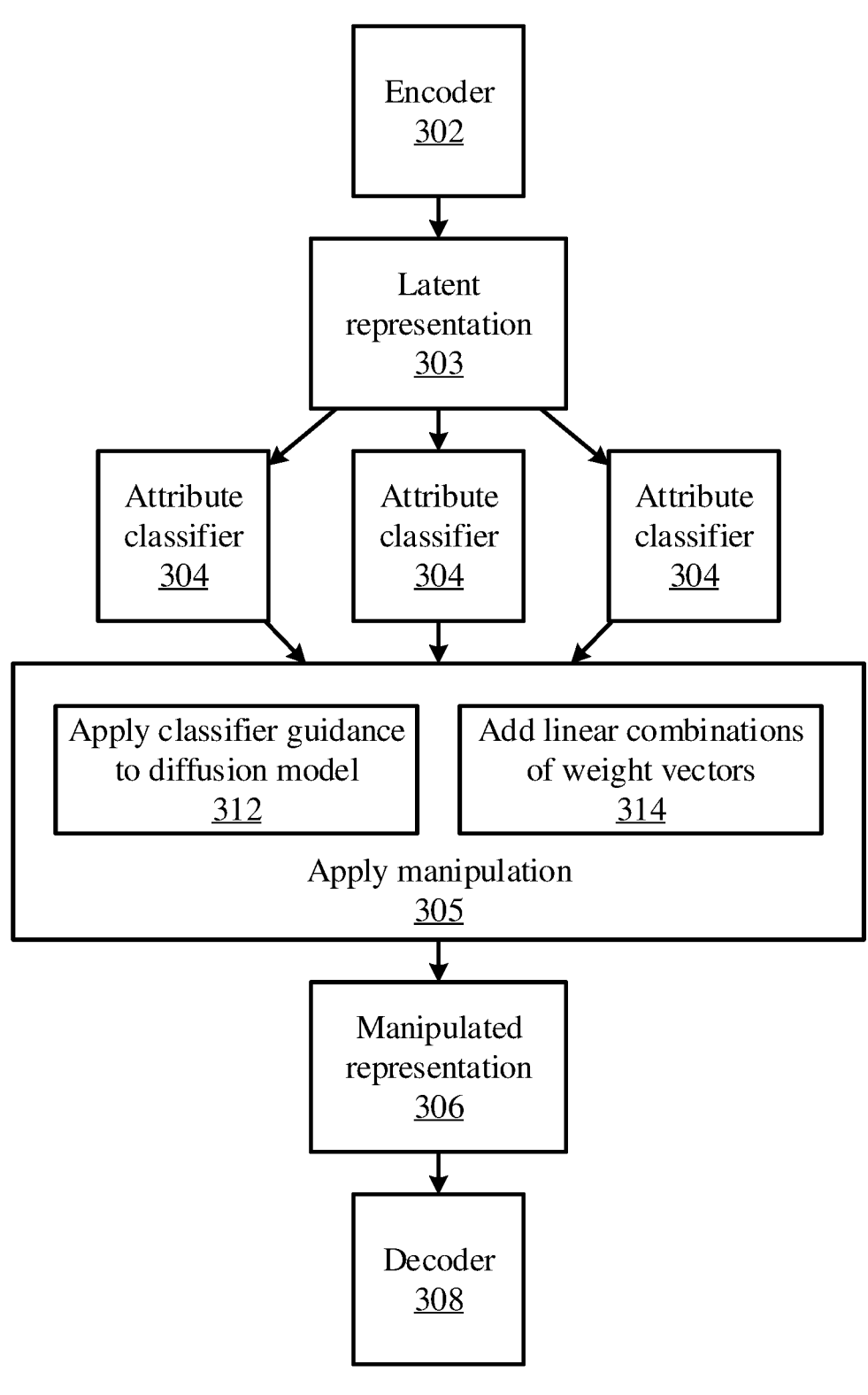
FIG. 3 is a block/flow diagram of manipulation of a latent representation of an image using attribute classifiers, in accordance with an embodiment of the present invention.

Referring now to FIG. 3, the manipulation of an image is shown. An encoder 302 accepts an input and generates a latent representation 303 of the input. The latent representation 303 is manipulated by attribute classifiers 304 to produce a manipulated representation 306.

As noted above, this manipulation 305 may be implemented by training a diffusion model to approximate the latest distribution with classifier guidance 312 or by adding linear combinations of weight vectors of attribute predictors as a guidance term to the latent representation 303. The manipulated representation 306 is processed by the decoder 308 to generate output images that match a specified attribute. As noted above, the encoder 302 and the decoder 308 may be part of a pre-trained model.

Figure 4:
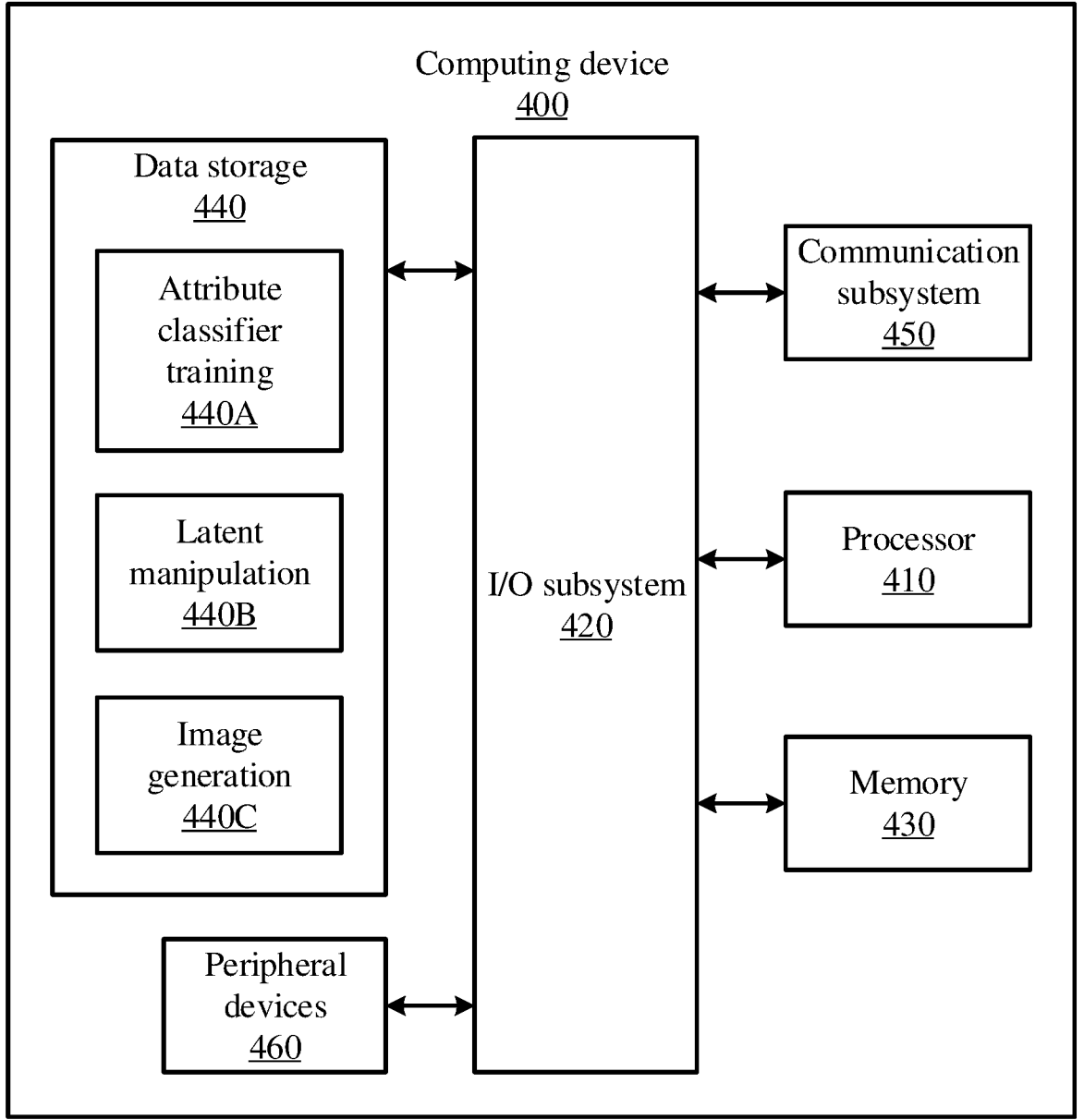
FIG. 4 is a block diagram of a computing system that can perform image manipulation, in accordance with an embodiment of the present invention.

Referring now to FIG. 4, an exemplary computing device 400 is shown, in accordance with an embodiment of the present invention. The computing device 400 is configured to perform named entity recognition.

The computing device 400 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 400 may be embodied as one or more compute sleds, memory sleds, or other racks, sleds, computing chassis, or other components of a physically disaggregated computing device.

As shown in FIG. 4, the computing device 400 illustratively includes the processor 410, an input/output subsystem 420, a memory 430, a data storage device 440, and a communication subsystem 450, and/or other components and devices commonly found in a server or similar computing device. The computing device 400 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 430, or portions thereof, may be incorporated in the processor 410 in some embodiments.

The processor 410 may be embodied as any type of processor capable of performing the functions described herein. The processor 410 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 430 may be embodied as any type of volatile or non-volatile memory or data storage capable of performing the functions described herein. In operation, the memory 430 may store various data and software used during operation of the computing device 400, such as operating systems, applications, programs, libraries, and drivers. The memory 430 is communicatively coupled to the processor 410 via the I/O subsystem 420, which may be embodied as circuitry and/or components to facilitate input/output operations with the processor 410, the memory 430, and other components of the computing device 400. For example, the I/O subsystem 420 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 420 may form a portion of a system-on-a-chip (SOC) and be incorporated, along with the processor 410, the memory 430, and other components of the computing device 400, on a single integrated circuit chip.

The data storage device 440 may be embodied as any type of device or devices configured for short-term or long-term storage of data such as, for example, memory devices and circuits, memory cards, hard disk drives, solid state drives, or other data storage devices. The data storage device 440 can store program code 440A for training attribute classifiers, 440B for manipulating latent image representations with attribute guidance, and/or 440C for generating images and videos. Any or all of these program code blocks may be included in a given computing system. The communication subsystem 450 of the computing device 400 may be embodied as any network interface controller or other communication circuit, device, or collection thereof, capable of enabling communications between the computing device 400 and other remote devices over a network. The communication subsystem 450 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 400 may also include one or more peripheral devices 460. The peripheral devices 460 may include any number of additional input/output devices, interface devices, and/or other peripheral devices. For example, in some embodiments, the peripheral devices 460 may include a display, touch screen, graphics circuitry, keyboard, mouse, speaker system, microphone, network interface, and/or other input/output devices, interface devices, and/or peripheral devices.

Of course, the computing device 400 may also include other elements (not shown), as readily contemplated by one of skill in the art, as well as omit certain elements. For example, various other sensors, input devices, and/or output devices can be included in computing device 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 400 are readily contemplated by one of ordinary skill in the art given the teachings of the present invention provided herein.

Figure 5:
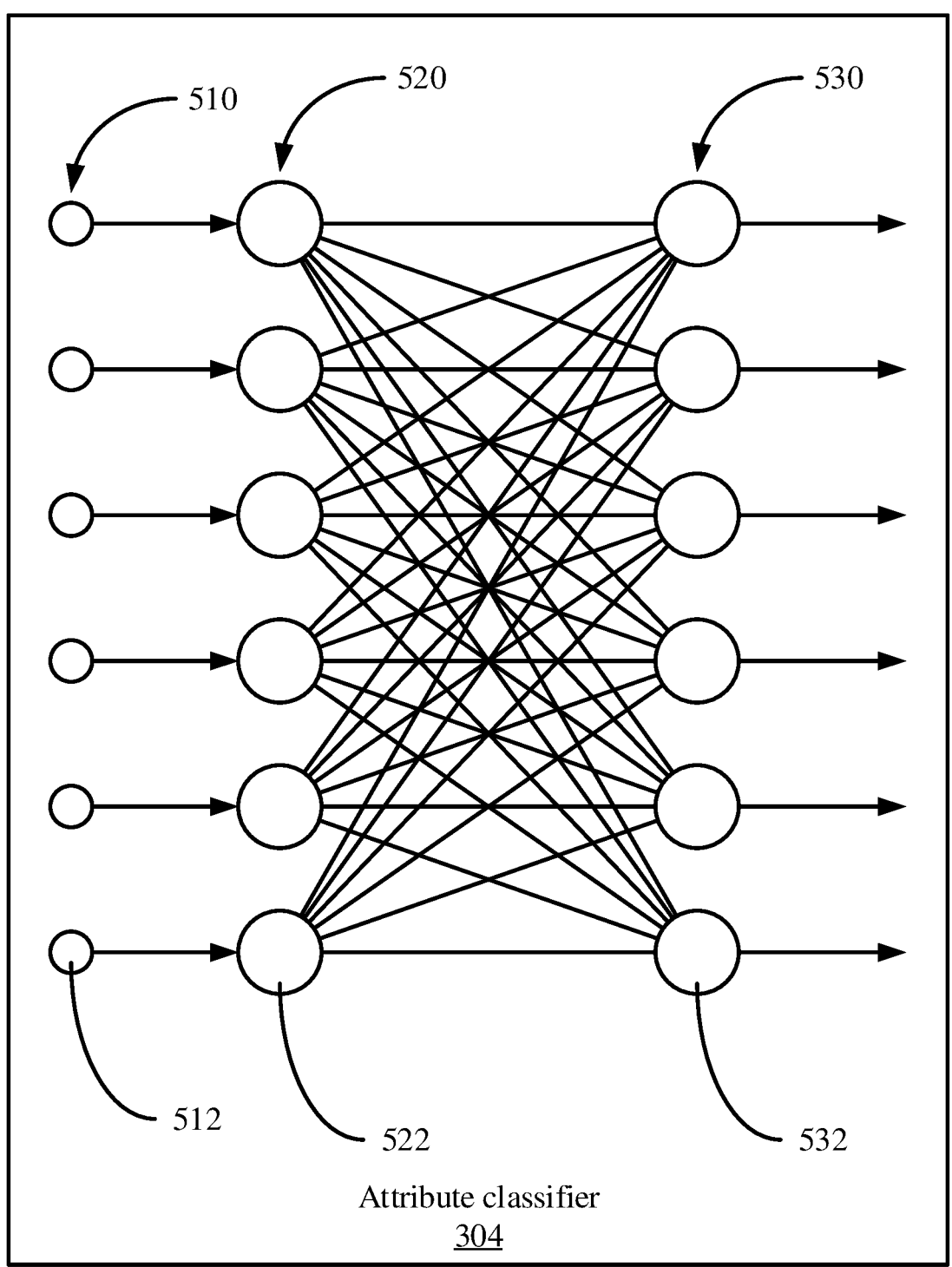
FIG. 5 is a diagram of a neural network architecture that can be used as part of the attribute classifiers, in accordance with an embodiment of the present invention.
Figure 6:
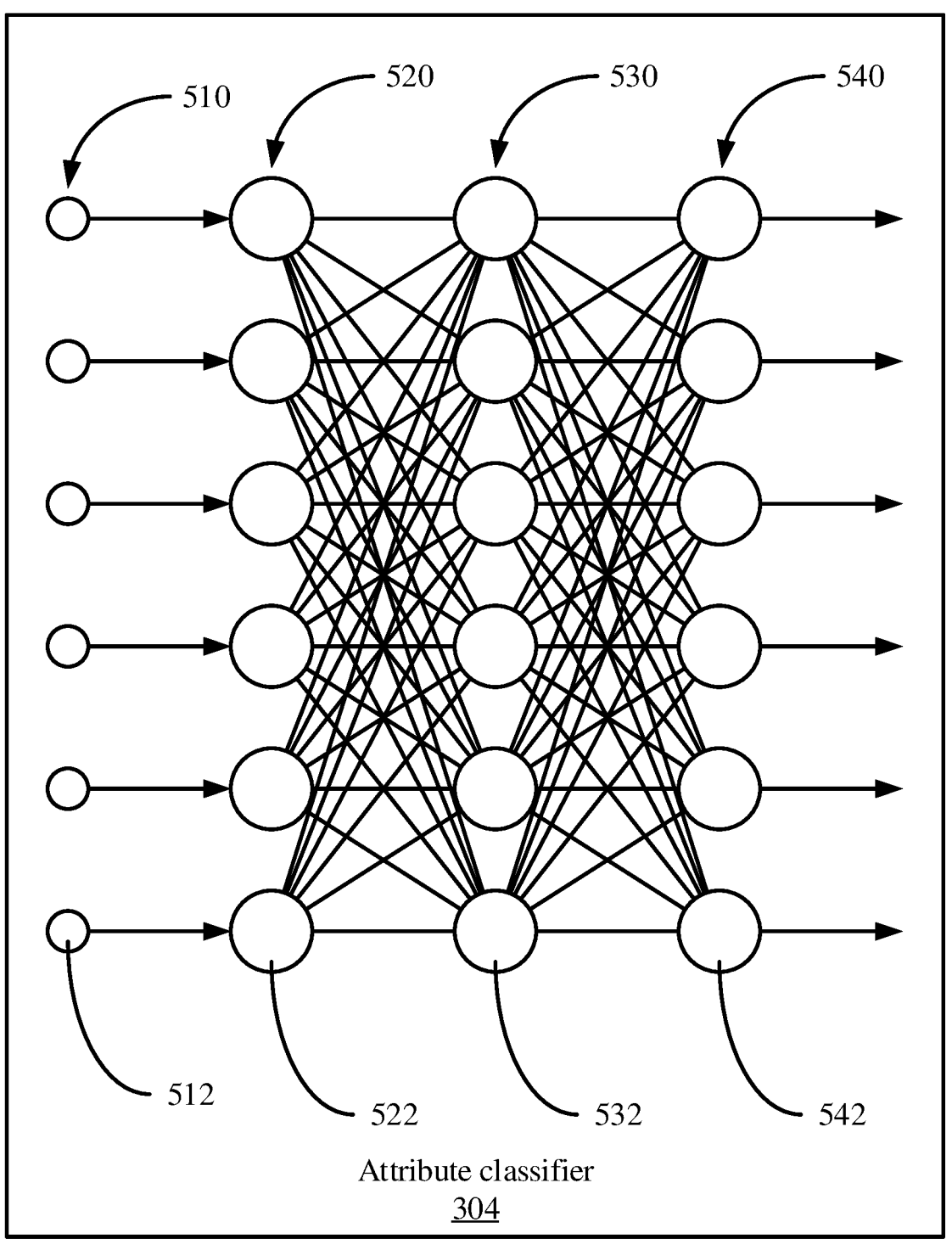
FIG. 6 is a diagram of a deep neural network architecture that can be used as part of the attribute classifiers, in accordance with an embodiment of the present invention.

Referring now to FIGS. 5 and 6, exemplary neural network architectures are shown, which may be used to implement parts of the present models, such as the attribute classifiers 304. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 520 of source nodes 522, and a single computation layer 530 having one or more computation nodes 532 that also act as output nodes, where there is a single computation node 532 for each possible category into which the input example could be classified. An input layer 520 can have a number of source nodes 522 equal to the number of data values 512 in the input data 510. The data values 512 in the input data 510 can be represented as a column vector. Each computation node 532 in the computation layer 530 generates a linear combination of weighted values from the input data 510 fed into input nodes 520, and applies a non-linear activation function that is differentiable to the sum. The exemplary simple neural network can perform classification on linearly separable examples (e.g., patterns).

A deep neural network, such as a multilayer perceptron, can have an input layer 520 of source nodes 522, one or more computation layer(s) 530 having one or more computation nodes 532, and an output layer 540, where there is a single output node 542 for each possible category into which the input example could be classified. An input layer 520 can have a number of source nodes 522 equal to the number of data values 512 in the input data 510. The computation nodes 532 in the computation layer(s) 530 can also be referred to as hidden layers, because they are between the source nodes 522 and output node(s) 542 and are not directly observed. Each node 532, 542 in a computation layer generates a linear combination of weighted values from the values output from the nodes in a previous layer, and applies a non-linear activation function that is differentiable over the range of the linear combination. The weights applied to the value from each previous node can be denoted, for example, by $w_1$, $w_2$, . . . , $w_{n-1}$, $w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 532 in the one or more computation (hidden) layer(s) 530 perform a nonlinear transformation on the input data 512 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention.

Having thus described aspects of the invention, with the details and particularity required by the patent laws, what is claimed and desired protected by Letters Patent is set forth in the appended claims.

What is claimed is:

1. A computer-implemented method for image generation, comprising:

generating a latent representation of an image;

modifying the latent representation of the image based on a trained attribute classifier and a specified attribute input as:

$$z_0 = \hat{z} + \frac{1}{\gamma_0} \sum_{i=1}^{n} \alpha_0^i w^i$$

where $\hat{z}$ is the latent representation, $\gamma_0$ is the specified attribute, $$\alpha_0^i$$

is a scalar value, and $w^i$ is a gradient of a log-linear condition predictor, and n is a number of attributes; and decoding the modified latent representation to generate an output image that matches the specified attribute input.

2. The method of claim 1, wherein modifying the latent representation includes applying a plurality of trained classifiers, in accordance with a plurality of specified attribute inputs.

3. The method of claim 2, wherein the plurality of specified attribute inputs include conjunction and/or negation relations.

4. The method of claim 2, wherein modifying the latent representation includes adding linear combinations of weight vectors from the plurality of attribute classifiers to the latent representation of the image.

5. The method of claim 1, wherein modifying the latent representation includes applying classifier guidance to a diffusion model.

6. The method of claim 5, wherein applying the classifier guidance includes perturbing unconditioned output of the diffusion model with an output of the attribute classifier.

7. The method of claim 1, wherein generating the latent representation includes applying a pretrained encoder model to the input image and wherein decoding the modified latent representation includes applying a pretrained decoder model, corresponding to the pretrained encoder model, to the modified latent representation.

8. The method of claim 7, wherein the encoder model and the decoder model are part of a latent diffusion model.

9. The method of claim 1, wherein modifying the latent representation includes applying a plurality of different attributes that specify respective quantifiable or natural language inputs.

10. The method of claim 1, wherein the log-linear condition predictor is log $p(y_i|z_t)$, the log of the conditional probability of attribute $y_i$ given a state $z_t$.

11. A system for image generation, comprising:

a hardware processor; and a memory that stores a computer program which, when executed by the hardware processor, causes the hardware processor to:

generate a latent representation of an image;

modify the latent representation of the image based on a trained attribute classifier and a specified attribute input as:

$$z_0 = \hat{z} + \frac{1}{\gamma_0} \sum_{i=1}^{n} \alpha_0^i w^i$$

where $\hat{z}$ is the latent representation, $\gamma_0$ is the specified attribute, $$\alpha_0^i$$

is a scalar value, and $w^i$ is a gradient of a log linear condition predictor, and n is a number of attributes; and decode the modified latent representation to generate an output image that matches the specified attribute input.

12. The system of claim 11, wherein the computer program further causes the hardware processor to modify the latent representation includes applying a plurality of trained classifiers, in accordance with a plurality of specified attribute inputs.

13. The system of claim 12, wherein the plurality of specified attribute inputs include conjunction and/or negation relations.

14. The system of claim 12, wherein the computer program further causes the hardware processor to add linear combinations of weight vectors from the plurality of attribute classifiers to the latent representation of the image.

15. The system of claim 11, wherein the computer program further causes the hardware processor to apply classifier guidance to a diffusion model.

16. The system of claim 15, wherein the computer program further causes the hardware processor to perturb unconditioned output of the diffusion model with an output of the attribute classifier.

17. The system of claim 11, wherein the computer program further causes the hardware processor to apply a pretrained encoder model to the input image and to apply a pretrained decoder model, corresponding to the pretrained encoder model, to the modified latent representation.

18. The system of claim 17, wherein the encoder model and the decoder model are part of a latent diffusion model.

19. The system of claim 11, the computer program further causes the hardware processor to apply a plurality of different attributes that specify respective quantifiable or natural language inputs.

*    *    *    *    *